INVENTOR
Walter Erbe
By Krafft & Wells
ATTORNEYS

United States Patent Office 3,562,772
Patented Feb. 9, 1971

3,562,772
MEASURING DEVICE
Walter Erbe, Lohnberg, Germany, assignor to
Ernst Leitz G.m.b.H., Wetzlar, Germany
Filed Jan. 9, 1969, Ser. No. 790,038
Claims priority, application Germany, Jan. 19, 1968,
P 16 73 969.8
Int. Cl. G01b 5/00
U.S. Cl. 33—143                                   8 Claims

ABSTRACT OF THE DISCLOSURE

A measuring device including means for determining the position and length of an object to be measured, a measuring scale of which the plane of the graduation or grating is positioned distant from the plane of the measurement, and wherein an image of the grating is projected onto itself by an illumination device, an image-forming system, and a plane mirror, and a pulse-generating system which includes photoelectric receivers. The means for determining the position is in connection with the measuring scale and the plane mirror, and, for the purpose of avoiding errors in measurement which can result from a tilting of the plane of the means for determining the position, the focal length of the image-forming system is made equal to the distance between the plane of the measurement and the plane of the measuring scale grating. Thus, the measuring scale is placed optically in the plane of the measurement.

CROSS-REFERENCE TO RELATED APPLICATIONS

Applicant claims priority under 35 USC 119 for application P 16 73 969.8 (originally numbered L 58,392 IXb/42d), filed Jan. 19, 1968 in the Patent Office of the Federal Republic of Germany.

BACKGROUND OF THE INVENTION

The present invention relates to a distance-measuring device. More particular it relates to a measuring device of the type wherein the image of a grating is projected back onto itself. Any lateral displacement of the grating causes a modulation of the image-forming light beam which behind the grating impinges on at least one photoelectric receiver where pulses are generated that are counted by counters. Measuring devices of this nature and the principle according to which they work are disclosed in the "Journal of Scientific Instruments," August 1960, page 261, and also in the Swiss Pat. 401,500.

With such devices it is a disadvantage, however, that the measuring scale and the object to be measured are, as a rule, not located in the same plane. If, therefore, the measuring scale with the grating is laterally displaced certain inaccuracies in the guiding elements will result in a slight tilting of the means adapted to determine the position of the object to be measured relative to the scale, which produces errors of the first order in the measurement.

It is therefore an object of the invention to provide additional means with the above described measuring devices, which means compensate for the mentioned measurement errors caused by the tilting.

SUMMARY OF THE INVENTION

According to the invention the mentioned object is attained by designing the objective which projects an image of the measuring scale grating onto a plane mirror and which further projects the light beams reflected from the mirror back onto the grating in such a way that its focal length is equal to the distance between the plane of the measurement and the grating. Additionally, the elements which support the object to be measured are mechanically connected with the measuring scale and with the plane mirror; and the grating of the measuring scale is imaged onto itself by means of the objective and the plane mirror.

DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
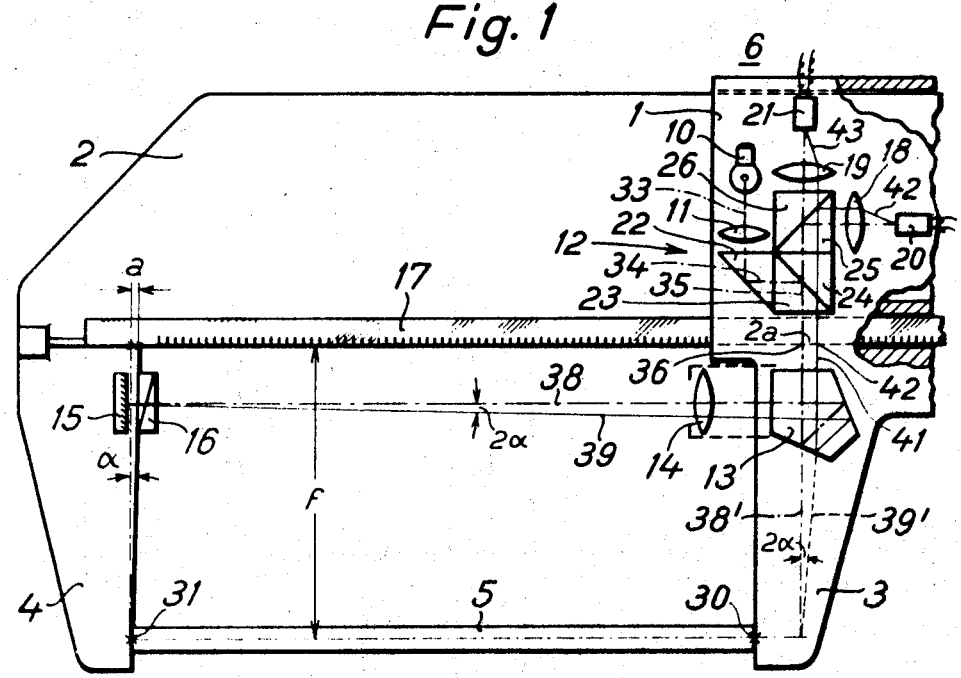
FIG. 1 shows a distance-measuring device of the slide-gauge type illustrating the basic principle of the invention.

Referring now to the drawings particular attention is drawn to the fact that the slide-gauge type device illustrated in FIG. 1 is shown for the specific purpose of explaining the improvement by means of a simple and uncomplicated device. A device of this nature can certainly be designed and constructed, however, it will be difficult to handle it in a workshop or the like. While this slide-gauge type device shows the theoretical background of the improvement very plainly, it is rather the embodiment of FIG. 2 which shows practical application of the invention.

Further, for the purpose of counting the pulses it is advantageous to evaluate the pulses which define one particular position of the object to be measured in two different phases having preferably a phase shift of 90° between them. Such phase shifts make it possible to employ up-down counters, and they can be produced by means of a double measuring scale of which the two gratings are displaced relative to each other, or by a single measuring scale if the image-forming light beam is split into two portions by means of a polarizing element. Although the invention is described with reference to two drawings which both show beam doubling and polarizing elements it is to be understood that these elements are not absolutely necessary. The measuring devices function perfectly well if these elements are omitted, however, the measurement movement can then only be performed in one direction, i.e. no up-down counters can be employed.

The measuring device shown in FIG. 1 comprises two legs 3, 4 which can be moved along a stationary guide member 2. These legs 3, 4 are means adapted to determine the position of the object to be measured. Leg 4 is connected with a measuring scale 17, and leg 3 is connected with a housing 1 which contains means for projecting an image of the grating of scale 17 back onto itself.

The grating of scale 17 is clearly indicated in the drawing, however, it is to be understood that the lines which constitutes the grating extend normal at the plane of the drawing. The means adapted to form an image of the lines of the grating and project this image back onto the grating itself comprise a light source 10, a condenser 11, a system of prisms 12, a double mirror 13—which term is meant to include also a prism causing an even number of reflections—and an objective 14. The mentioned means further include a plane mirror 15 and a polarizing, phase-shifting Wollaston prism 16 which two elements are rigidly mounted on leg 4 in the manner discernible from FIG. 1.

The prism system 12 comprises the prisms 22 through 26 with the interface between the prisms 23 and 24 being semi-transparent and the prisms 25 and 26 being a polarizing beam splitter.

The objective 14 is of the focal length $f$. The principal plane of this objective is reflected by the double mirror 13 is such a way that the plane is apparently positioned at the distance $f$ in parallel to the measuring scale 17.

In this apparent principal plane is also located the plane of the measurement of the whole device, the end-points thereof being marked 30 and 31. At these end-points feelers can be provided for contacting the object to be measured mechanically, optically and/or pneumatically. In case rotating objects are to be measured which cannot be contacted directly it will be advantageous to use pneumatic nozzles as feelers and to control the machine tool according to the readings obtained from the feelers. However, for sake of simplicity of the drawing an illustration of feelers of any kind has been omitted.

The following is a description of further details of the path of the light emitted by light source 10. The bundle of light rays 33 originating from source 10 is guided by prism system 12 along the paths 34, 35 and transmits through scale 17, the latter being manufactured from glass. Since the grating of scale 17 consists in known manner of alternately arranged transparent and non-transparent lines the intensity of the bundle of light rays will vary periodically if scale 17 is displaced laterally. After intensity variation the light rays impinge on the double mirror 13 and are therefrom reflected to objective 14. Owing to the fact that the grating of scale 17 is disposed by a distance $f$ from the objective principal plane, the objective 14 functions as a collimator lens, i.e. the light rays travel from objective 14 as a parallel bundle of rays 38.

Now, if the bundle of rays 38 impinges perpendicularly on plane mirror 15 it will be reflected within itself and will again be collected by objective 14 at spot 36, i.e. and image of the grating will be reflected onto itself. If, however, for example as the result of slack in the guiding elements, the normal of plane mirror 15 is tilted by an angle $\alpha$, then the distance to be measured between the points 30, 31 will be too long by a length $a = f \cdot \tan \alpha$. It is, therefore, this length $a$ which must be compensated for. This means that the variations in intensity which from hereon will be called pulses must be generated in a way as if scale 17 would be lengthened by length $a$.

If housing 1 together with leg 3 is displaced relative to leg 4 with scale 17 there will occur a doubling of pulses, owing to the movement in opposite directions of the grating and its re-projected image. As a consequence thereof, the apparent lengthening of scale 17, which is required as a compensation of length $a$, must be counted twice.

The compensation is achieved in the following manner: Since plane mirror 15 is tilted by angle $\alpha$, relative to its proper position the impinging bundle of rays 38 and the reflected bundle of rays 39 subtend angle $2\alpha$. For very small angles $\alpha$, $\tan 2\alpha = \tan \alpha$. Angle $2\alpha$ occurs in the reflected apparent path of rays 38', 39'. The bundle of rays 39 reflected by double mirror 13 impinges as the bundle of rays 41 on grating 17 at 42. It then transmits through scale 17 and travels toward prism system 12. It will be readily understood that the distance between spot 36 and spot 42 amounts to $2a$. Thus, if leg 4 is tilted from its proper position by an angle $\alpha$ relative to leg 3 the bundle of rays 39, 41 travels from spot 36 to spot 42 after reflection from plane mirror 15. Its intensity is thereby modulated, i.e. pulses are generated according to the number of lines along the length $2a$. This is exactly the number of pulses needed for compensation of the length $a$ since, as has been mentioned before, lateral displacement—contrary to tilting—causes the number of pulses to be doubled compared to the number of lines on the grating.

The bundle of rays 41 which is reflected by plane mirror 15 back into pirsm system 12 is split and polarized by the Wollaston prism 16 in known manner. Consequently, bundle 41 is split by the polarizing beam splitter 25, 26 into two portions 42 and 43 which are guided to the photo-electric receivers, 20 and 21 by way of the lenses 18 and 19. This results in a phase shift by 90° between the variations of the light intensity which, in turn, determines the up or down counting direction of the counters (not shown) that are connected to the receivers 20, 21.

Figure 2:
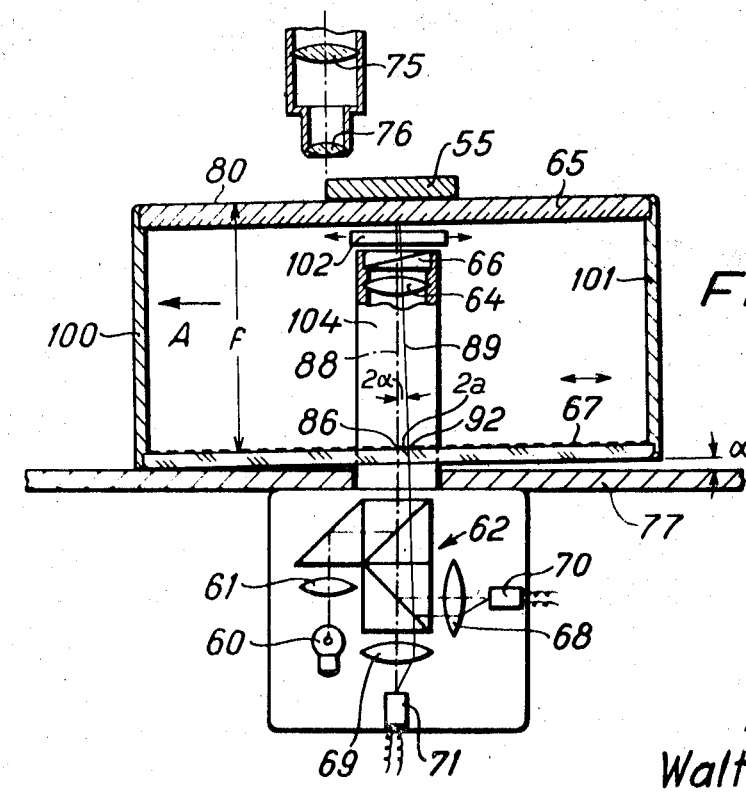
FIG. 2 shows a measuring table where the object to be measured is observed by means of a microscope.

FIG. 2 shows schematically a measuring table where the object to be measured is observed through a microscope. The microscope comprises an objective 76 and an ocular 75, and both elements are rigidly connected with the stationary parts of the table. Measurement is performed by first bringing one edge of the object to be measured 55 into alignment with the optical axis of the microscope and secondly by displacing this object laterally until the other object edge coincides with the optical axis. The required amount of displacement is equal to the length of the object. As the moving table a plane mirror 65 is used on the rear surface whereof the object 55 is placed. The measuring scale 67 with a cross grating thereon is arranged in parallel to the plane mirror 65 and both are rigidly connected by tie bars 100, 101. Of course, the object to be measured can also be supported by other supporting means as long as these means move synchronously with the plane mirror 65.

The remaining elements of the measuring table, i.e. a light source 60, a condenser 61, a system of prisms 62, an objective 64, a Wollaston prism 66, lenses 68, 69, and photoelectric receivers 70, 71 have a stationary mounting, with the Wollaston prism 66 being inclined by 45° relative to the two directions of the cross grating. Objective 64 and Wollaston prism 66 are supported by a carrier element 104 that extends from the rear into the space between plane mirror 65 and cross grating 67.

The function of these elements is as follows: If the measuring table—comprising plane mirror 65, cross grating 67 and tie bars 100, 101—is moved, for example, in the direction of arrow A inaccuracies of the grading surface 77 can cause a tilting of the measuring table in two directions. The table will then assume a position that differs by the angle $\alpha$ (in the plane of the drawing) and by an angle $\beta$ (in a plane perpendicular to the plane of the drawing) from its proper position. Both inaccuracies in measurement will be compensated for by the device according to the invention since this device is designed symmetrically with regard to the direction of measurement.

The objective 64 is designed and mounted so as to have its principal plane in the plane of measurement 80, with the latter being arranged at a distance $f$ (= the focal length of objective 64) from the graduation plane of cross grating 67. As a result thereof objective 64 acts as a collimator, which means that the plane of the graduation of cross grating 67 is projected into infinity but reflected by plane mirror 65 and is thus imaged onto itsself. During this procedure the apparent path of rays 88, 89 subtends an angle $2\alpha$ and the spots 86 and 92 are apart from each other by a distance $2a$ where $a = f \cdot \tan \alpha$. Evaluation is performed in the manner already described in connection with FIG. 1.

Compensation of the tilting angle $\beta$ (in a direction perpendicular to angle $\alpha$) is accomplished in like manner. However, for registration of the variations of light intensity in the other coordinate additional photoelectric receivers are employed (not shown).

In case oblique-angled directions of measurement are required the direction of the graduation of the cross grating is chosen or adjusted accordingly and the polarizing element is arranged symmetrically thereto.

Further, in the space between the objective 64 and plane mirror 65 an afocal lens system having a magnification factor $\Gamma$ can be introduced. Thereby, the principal plane of the complete system, including objective 64 and system 102, is displaced by a distance $f \cdot \Gamma$ with the focus staying in the plane of cross grating 67. By suitably choosing the magnification factor $\Gamma$, for example, the plane of measurement can be shifted to the level of the centers if the object to be measured is on the measuring table supported between centers, and in this plane then a measurement can be performed free from errors caused by tilting.

If a zoom objective is used in the place of objective 64 then the principal plane, together with the plane of measurement can be moved in a certain range and in each selected plane a compensation of measuring errors is achieved. In this case it is advantageous, however, to couple the setting member of the zoom objective with the focusing elements of the microscope in order to ensure a constant coincidence of the object plane of the microscope with the plane of measurement. If the object to be measured is to be observed in the microscope in transmitted light it is advisable to employ on plane mirror 65 a reflecting coating which has a high degree of transmission in the visible light range, and a high degree of reflection in the range of sensitivity of the photoelectric receivers.

What is claimed is:

1. A measuring device adapted to determine the length of an object to be measured, said device including: means adapted to determine the position of said object to be measured, said means defining a plane of measurement and having first and second end points for measuring length, a transparent measuring scale (17, 67) having a grating thereon, said grating being disposed in a plane different from but parallel to said plane of measurement, an illumination device stationary with respect to one of said end points (10, 11; 60, 61) adapted to illuminate said grating, means adapted to project an image of said grating into infinity, said means including an objective (14, 64) the focal length of which being equal to the distance between said plane of measurement and the plane of said grating, a plane mirror (15, 65) being rigidly connected to said means adapted to determine the position of said object to be measured, said plane mirror being adapted to reflect said grating-imaging light rays back into said objective, thereby projecting an image of said grating onto itself, and a photoelectric receiver means (20, 21, 70, 71) stationary with respect to said illuminating device and arranged behind said measuring scale (17, 67) in the direction of the reflected light beams.

2. A measuring device as claimed in claim 1, wherein said means adapted to determine the position of said object to be measured comprises two legs (3, 4) defining said end points and the plane of measurement between them and being displaceable relative to each other, one of said legs (4) being connected to said measuring scale and to said plane mirror, and the other one of said legs (3) being rigidly connected to said objective (14) and said illumination device (10, 11), and the device further comprising a double mirror (13) being arranged in the light path between said grating and said objective.

3. A measuring device as claimed in claim 1, wherein said illumination device (60, 61) and said photoelectric receiver means (70, 71) are mounted stationary, and wherein said means adapted to determine the position of said object to be measured comprises a measuring table, said measuring table being movable between said illumination device and a stationary microscope (75, 76) defining said end points, and further including a plane mirror (65) and a measuring scale having a grating thereon, said plane mirror (65) and said measuring scale being mounted in parallel; said objective (64) being disposed stationarily between them.

4. A measuring device as claimed in claim 3, wherein said objective is a zoom system.

5. A measuring device as claimed in claim 3, wherein said grating on said measuring scale (67) is a cross grating.

6. A measuring device as claimed in claim 3, wherein the objective comprises an additionally insertable afocal system (102).

7. A measuring device as claimed in claim 3, wherein said plane mirror (65) is provided with a coating having a high degree of transmission in the visible range of light and a high degree of reflection in the range of sensitivity of the photoelectric receiver means.

8. A measuring device as claimed in claim 1 and further comprising a beam doubling and polarizing element being disposed in the path of the grating-imaging light rays, a polarizing beam splitter being arranged behind the measuring scale in the direction of the reflected light rays, and photoelectric receivers being disposed in the direction of transmission and in the direction of reflection behind said polarizing beam splitter.

References Cited
UNITED STATES PATENTS

| | | | |
|---|---|---|---|
| 1,794,340 | 2/1931 | Parkhurst | 356—169X |
| 3,198,061 | 8/1965 | Hock | 356—169 |
| 3,245,307 | 4/1966 | De Lang | 356—169 |
| 3,482,107 | 12/1969 | Hock | 356—169X |

SAMUEL S. MATTHEWS, Primary Examiner

U.S. Cl. X.R.

33—125